June 25, 1968
C. M. SELWITZ
3,390,194
PHENOL RECOVERY
Filed May 24, 1965
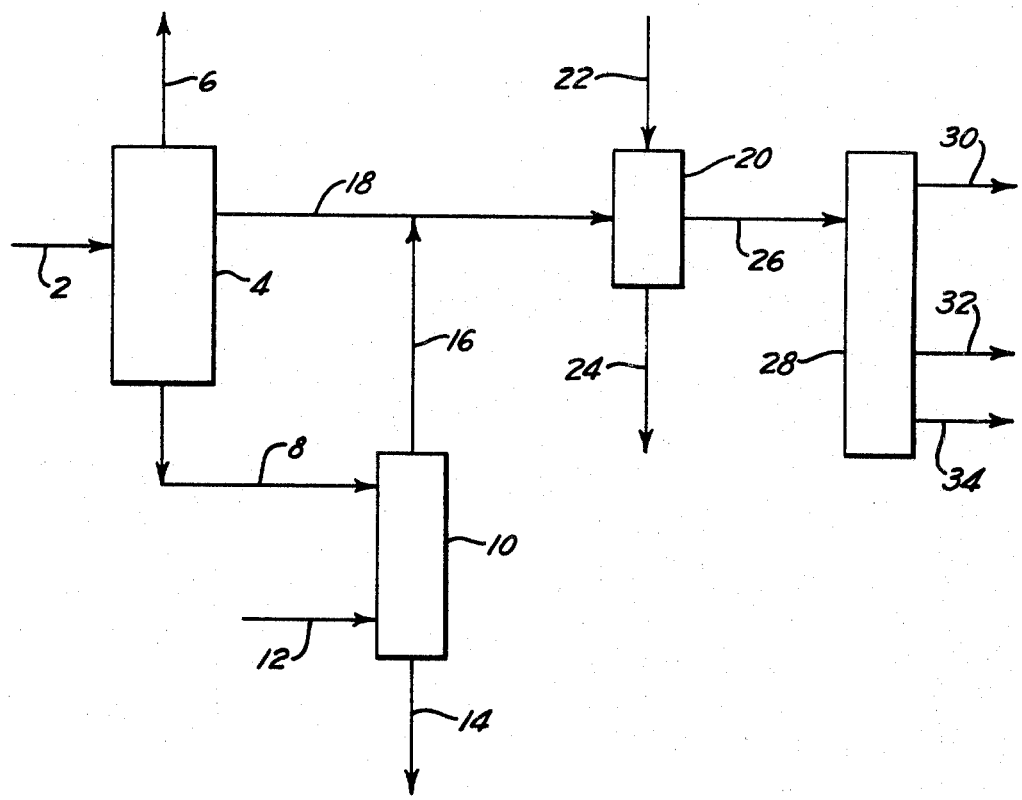
INVENTOR.
CHARLES M. SELWITZ 3,390,194
PHENOL RECOVERY
Charles M. Selwitz, Monroeville, Pa., assignor to Gulf Research & Development Company, Pittsburgh, Pa., a corporation of Delaware
Continuation-in-part of application Ser. No. 420,436, Dec. 22, 1964. This application May 24, 1965, Ser. No. 458,070
1 Claim. (Cl. 260—621)

ABSTRACT OF THE DISCLOSURE

A process for recovering phenol from admixture with a benzene compound, water and HBr. The process involves first separating from the admixture an organic phase containing the benzene compound and a portion of the phenol and an aqueous phase containing water, the remainder of the phenol and HBr. The aqueous phase is then extracted with a benzene compound to remove the phenol from the water. The extract is combined with the organic phase above and the combined product is water washed to remove residual amounts of HBr. The water-washed product is then distilled to recover the phenol.

---

This is a continuation-in-part application of my application Ser. No. 420,436, entitled, Process, which was filed on Dec. 22, 1964.

Briefly, application Ser. No. 420,436 relates to a process for oxidizing a benzene compound, such as benzene itself, to the corresponding phenol which comprises, for example, reacting in the vapor phase at a temperature of about 600° to about 800° C. a benzene compound with about 0.02 to about five mols thereof of oxygen in the presence of about 0.5 to about 50 mols thereof of water and about 0.0001 to about 0.20 mols thereof of a compound selected from the group consisting of HBr and a compound capable of resulting in the formation of HBr under the conditions of reaction, such as 1,2-dibromomethane, tertiary butyl bromide or tertiary amyl bromide.

This invention relates to a process for recovering the desired phenol from the reaction product obtained as a result of the process defined and claimed in application Ser. No. 420,436, particularly in the recovery of phenol free of HBr. Not only can HBr so recovered be reused in the oxidation of the benzene compound to obtain the corresponding phenol, but its presence with phenol is undesirable, since it has a tendency to lead to the decomposition of the phenol during its subsequent distillation.

The process defined and claimed herein can be understood by reference to the accompanying drawing which described a preferred embodiment thereof. The recovery of phenol from a reaction product obtained as a result of the oxidation of benzene will be described, but it is understood that the same recovery and purification system can also be employed to recover other purified phenols from mixtures resulting from the oxidation of other benzenes. In the drawing the reaction mixture produced in application Ser. No. 420,436, cooled to a temperature of about 0° to about 70° C., preferably to a temperature of about 20° to about 30° C., by any suitable means, is introduced into the system by line 2. The mixture in line 2 can contain, in parts by weight, from about 1 to about 100 parts of benzene; about one to about 50 parts of phenol; about 35 to 500 parts of water; at least about 0.01 part of HBr, but generally about 0.2 to 16 parts of HBr; about 0.6 to about 160 parts of oxygen; about 0.01 to about 100 parts of by-product gases, such as carbon monoxide and carbon dioxide; and about 0.01 to about 20 parts of higher molecular weight compounds, such as biphenyl, etc.

The mixture in line 2 is introduced into separator 4 which can be maintained at a temperature of about 0° to about 40° C., preferably about 15° to about 25° C., and a pressure of about 0.10 to about 100 atmospheres, preferably about one atmosphere. The mixture in separator 4 resolves itself into a lower aqueous layer, an upper organic layer and gases. The gases are removed overhead by line 6 and can be recycled as such, or preferably, after removal of carbon monoxide and carbon dioxide therefrom, to the oxidation stage wherein benzene is oxidized to phenol.

The lower aqueous phase, containing most of the HBr and from about 20 to about 50 percent by weight of the phenol in separator 4, is removed from separator 4 by line 8 and is passed to extraction tower 10 which is maintained at a temperature of about 0° to about 90° C., preferably about 15° to about 25° C., and a pressure of about 0.10 to about 100 atmospheres, preferably atmospheric pressure. Benzene is introduced by line 12 into extraction tower 10 adjacent the base thereof and is passed upwardly therethrough countercurrent to the movement of the aqueous phase therein. The benzene to aqueous phase weight ratio in extraction tower 10 is maintained within a range of about 1:1 to about 10:1, preferably within a range of about 2:1 to about 5:1. As a result of these considerations there is removed from the base of extraction tower 10 by line 14 water, substantially all of the HBr and trace amounts of phenol. This stream can be discarded, if desired, but preferably it is recycled to the oxidation stage wherein benzene is oxidized to phenol. If desired, the HBr can be reacted with an organic compound, such as an olefin, to obtain an alkyl halide which can be employed in the aforesaid oxidation stage. There is removed overhead from extraction tower 10 by line 16 benzene and substantially all of the phenol that was present in the aqueous phase.

The organic phase in separator 4 containing benzene, phenol and the higher boiling organic products is removed from separator 4 by line 18, combined with the mixture in line 16 and the combined product passed to water washer 20. Water in an amount of about 0.1 to about 20 percent by weight, preferably about one to two percent by weight, based on the benzene, is introduced into water washer 20 by line 22. The temperature in water washer 20 can be maintained from about 0° to about 40° C., preferably from about 15° to about 25° C., and the pressure from about 0.10 to about 100 atmospheres, preferably at about one atmosphere. The purpose of the water is to remove any residual traces of HBr from the organic phase in water washer 20. The water containing HBr is removed from the base of water washer 20 by line 24 and can be discarded or, if desired, can be recycled to the oxidation stage previously described.

The remainder of the product is removed from water washer 20 by line 26 and passed to a distillation column, or other suitable distillation zone, 28, which can be maintained at a temperature of about 20° to about 300° C., preferably about 60° to about 200° C., and a pressure of about $10^{-2}$ to about 30 pounds per square inch gauge, preferably about one to about 15 pounds per square inch gauge. Pure benzene is removed overhead by line 30, pure phenol by line 32 and heavier products, which can be discarded, by line 34. The benzene in line 30 can be recycled to the oxidation zone to produce additional phenol.

The process defined herein can further be understood by the following. Into a calorized reactor (one having an aluminum oxide internal surface) which was 24 inches high and had an internal diameter of one inch, and which was maintained at atmospheric pressure, there was continuously added 6.4 mols per hour of water, 0.0029 mol per hour of HBr (dissolved initially in the water), 0.86 mol per hour of benzene and 0.45 mol per hour of oxygen. The temperature throughout the reactor averaged 682° C. and the highest temperature reached therein was 684° C. The product from the reactor was cooled to a temperature of 25° C. over a period of one hour. The upper layer, containing 49 grams of benzene, 3.9 grams of phenol and smaller quantities of biphenyl and other byproducts, was separated from the lower layer, containing 115 grams of water, 0.23 gram of HBr and 3.6 grams of phenol. The aqueous phase was extracted with 200 grams of benzene at 25° C. The organic phase resulting from this extraction, containing about 200 grams of benzene and three grams of phenol was added to the benzene phase originally separated from the reaction product. The extracted aqueous phase containing the HBr and a trace of phenol was recycled to the oxidation stage. The combined benzene phases were extracted with 10 cc. of water at 25° C. to remove traces of HBr therein. The remainder of the material was then distilled at a temperature of 70° to 200° C. to obtain 249 grams of benzene, 6.5 grams of phenol and a small amount of distillation bottoms. The purification procedure described above was carried out at atmospheric pressure.

Obviously many modifications and variations of the invention, as hereinabove set forth, can be made without departing from the spirit and scope thereof, and only such limitations should be imposed as are indicated in the appended claim.

I claim:

1. In a process wherein benzene is reacted in the vapor phase at elevated temperatures with oxygen in the presence of water and a compound capable of resulting in the formation of HBr under the conditions of the reaction to obtain a reaction mixture containing phenol, benzene, water, HBr and oxygen, the improvement in recovering phenol free of HBr from said mixture which comprises separating from said mixture at a temperature between 0° and 40° C. an organic phase containing said benzene and a portion of said phenol, an aqueous phase containing water, the remainder of said phenol and HBr and oxygen, extracting said aqueous phase with benzene at a temperature between 0° and 90° C. to obtain an extract containing benzene and said remainder of said phenol, combining said extract and said organic phase, washing the combined product so obtained with water at a temperature between 0° and 40° C. and to remove residual amounts of HBr, separating said combined product from said water and thereafter separately recovering phenol and benzene from said combined product by distillation.

References Cited
UNITED STATES PATENTS 2,035,917    3/1936    Prahl et al. _____ 260—621

OTHER REFERENCES

Kleinberg, J., et al., Inorganic Chemistry, Heath & Company, Boston, 1960, pp. 470–1.

BERNARD HELFIN, *Acting Primary Examiner.*

LEON ZITVER, *Examiner.*

H. ROBERTS, *Assistant Examiner.*